United States Patent Office.

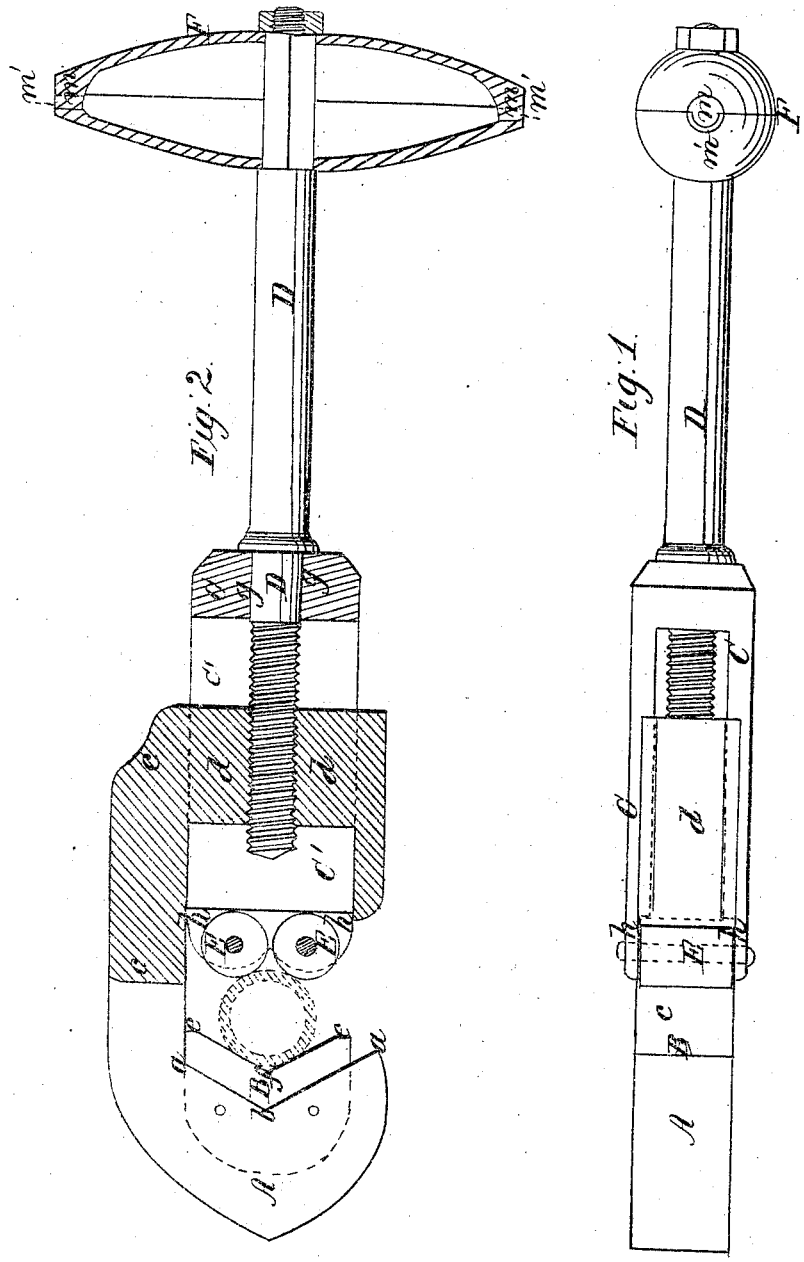

HENRY GETTY, OF BROOKLYN, NEW YORK.

Letters Patent No. 67,530, dated August 6, 1867.

---

IMPROVED TUBE-CUTTER.

---

The Schedule referred to in these Letters Patent and making part of the same.

---

TO ALL WHOM IT MAY CONCERN:

Be it known that I, HENRY GETTY, of Brooklyn, in the county of Kings, and State of New York, have invented certain new and useful improvements in Tube-Cutters; and I do hereby declare that the following is a full, clear, and exact description of the same, reference being had to the accompanying drawings, making a portion of this specification, in which—

Figure 1 is an edge view of a tube-cutter constructed according to my invention.

Figure 2 is a central longitudinal section of the same, taken at right angles to fig. 1.

Similar letters of reference indicate corresponding parts in both figures.

This invention consists in the arrangement of two transverse rollers in combination with a V-shaped cutter, whereby a draw cut on the tube is obtained in either direction, the instrument is held steadily in position during the cutting operation, and the bur formed upon the pipe by the cutter is effectually smoothed down by the rollers during the operation of cutting.

To enable others to understand the construction and operation of my invention, I will proceed to describe it with reference to the drawings.

The head A of the apparatus is designed to have its inner side made V-shaped, as indicated at $a\ b$ in fig. 1, and is connected by a strong bar, $c$, with a rectangular block, $d$, the said head, bar, and block being formed in one piece of any suitable me 1. Secured in the head A, in any suitable manner, and projecting inward from the inner side of the aforesaid head, is a cutter, B, the cutting edge $e f$ of which is V-shaped, or, in other words, which is recessed, so that the two portions of the same stand at an angle to each other, as represented in the figure (2) just mentioned. C shows a rectangular slide, formed with a large slot, $C'$, in which is situated the block $d$ of the head A, the sides of the slide being fitted into broad and shallow grooves in the sides of the aforesaid block, in such manner as to be securely held thereon, and at the same time be capable of a longitudinal movement upon the same, such longitudinal movement being produced by means of a cylindrical screw-shank, D, the inner end of which passes through a suitable hole, $g$, in the outer end of the slide C, and is screwed into a female screw formed in the block $d$, as shown in fig. 2, so that, by turning the shank in one direction or the other, as the case may be, the slide may be moved in or out, as circumstances may require. The innermost end of the slide D is open, and is furnished at each side with two inwardly-extending ears $h$, in which are formed bearings for the pivots of two rollers E, which are so placed that the space between them is situated opposite the angle $f$ of the cutter, and the position of which is transverse to that of the said cutter.

In using the implement, the pipe or tube, shown in red outline in fig. 2, is placed transversely to the cutter, between the same and the two rollers E; and the cutter is tightened upon the said pipe or tube by turning the screw-shank D, as hereinbefore set forth, through the agency of a transverse handle, F, attached to the outer end thereof, and hereinafter fully described, which being done the implement is turned around the pipe or tube, whereupon the cutter B partially cuts or severs the same, the said pipe or tube being completely severed by successively tightening the cutter upon it, and forcing the same around the pipe, in the manner just set forth, the V shape of the cutter causing the same to act with a draw cut in whichever direction it may be turned in severing the pipe, while the two rollers E, being situated opposite the said cutter, as hereinbefore explained, and being situated in a position parallel therewith, not only support the same against the pressure of the cutter, but also serve to steady the implement during the cutting operation, by preventing any tendency of the same to be twisted around when thus in use; and furthermore, by pressing upon the bur formed or turned up by the cutter in severing the pipe, effectually smooths the same, thus greatly facilitating the operation of the dies in forming a screw-thread, when desired, upon the ends of the pipe or tube.

The handle F is hollow, and is formed of two concave sections of cast metal, which are placed together, with the outer end of the screw-shank D passing through suitable holes formed therein, as indicated more plainly in fig. 2, the two sections being tightened together by a suitable nut at the extremity of the said shank, or by other suitable means. The ends of one of the aforesaid sections are constructed with projections $m$, shown more clearly in fig. 1, which, when the handle is put together as just set forth, fit into recesses $m'$, of corresponding shape, formed in the corresponding ends of the other section, in such manner as to effectually prevent any lateral slipping or displacement of the two sections with reference to each other, a cheap and easily-constructed handle being by these means secured.

What I claim as my invention, and desire to secure by Letters Patent, is—

A tube-cutting implement, provided with a V-shaped cutter B, operating in combination with the two supporting-rollers E E, all constructed and arranged substantially as shown and described.

HENRY GETTY.

Witnesses:
J. W. COOMBS,
G. W. REED.